United States Patent Office 2,829,776
Patented Apr. 8, 1958

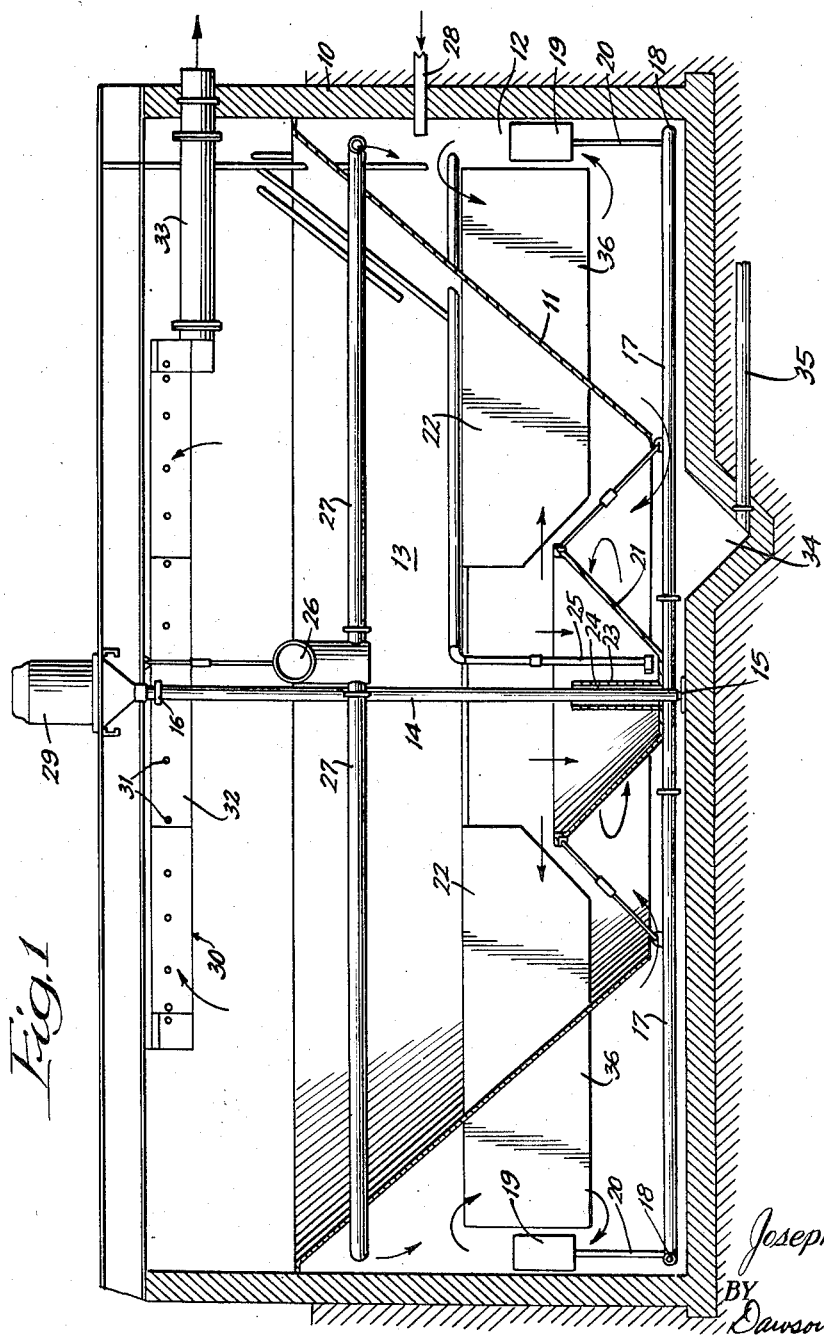

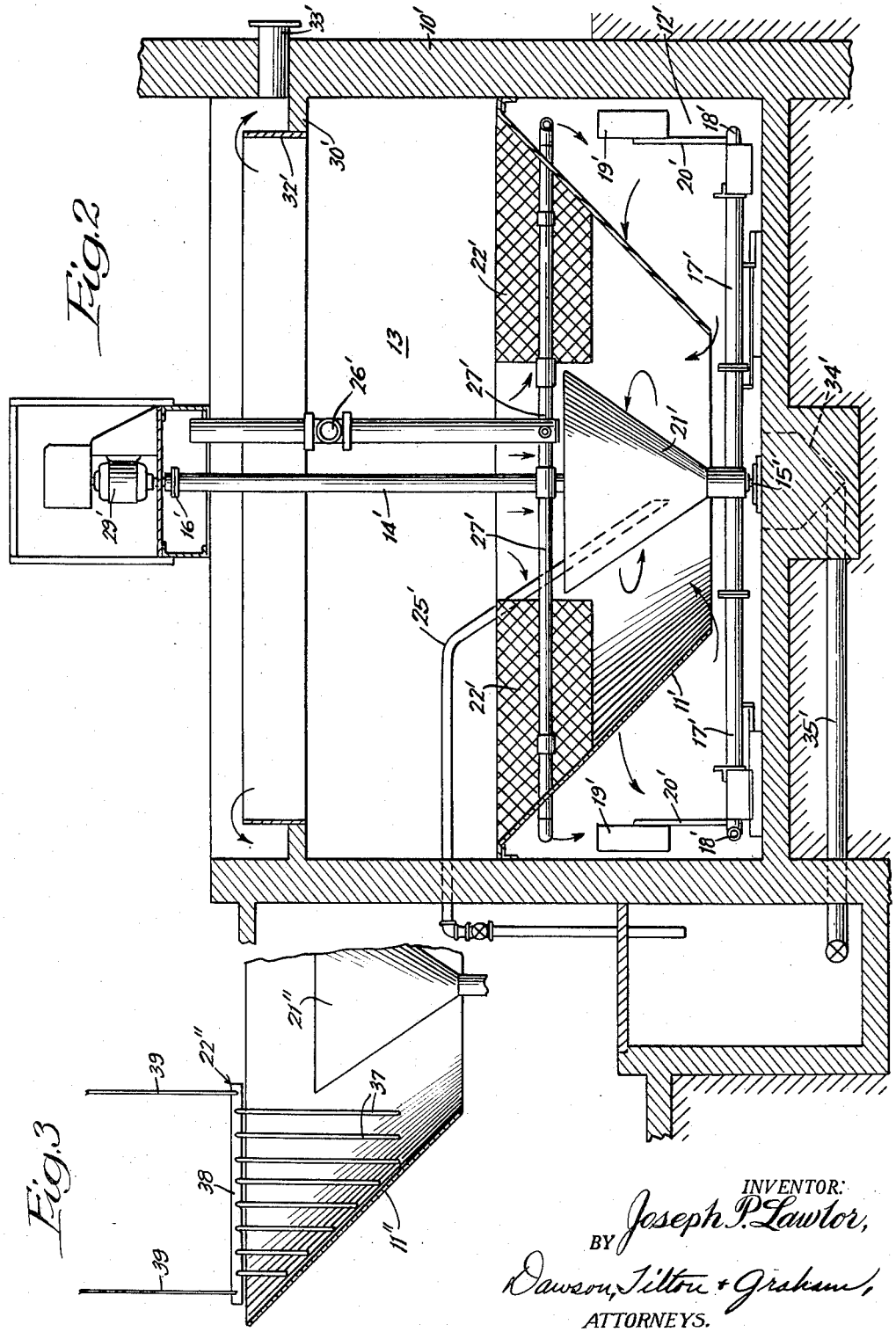

2,829,776
WATER TREATING APPARATUS

Joseph Patrick Lawlor, Ames, Iowa, assignor to General Filter Company, Ames, Iowa, a corporation of Iowa Application August 23, 1955, Serial No. 530,090

9 Claims. (Cl. 210—197)

This invention relates to a water treating apparatus, and more particularly to an apparatus of the type which is known in the water treating art as an upflow sludge clarifier. The principal elements of such an apparatus, as they have been previously known in the art, are illustrated by Spaulding Patent No. 2,021,672, and by Green Patent No. 2,368,354.

This application is a continuation-in-part of my copending application United States Serial No. 272,954, filed February 23, 1952, and now Patent No. 2,721,173. The subject matter that is now being claimed in said application, however, differs substantially from the subject matter that is being claimed in this application.

It is a general object of this invention to provide an upflow sludge clarifier which provides operating characteristics and advantages which distinguished it from previously known equipment within this general classification. The important features of my invention will become more apparent as the specification proceeds.

The accompanying drawings illustrate there embodiments of my invention, wherein Figure 1 is a cross-sectional view of an upflow sludge clarifier, as is Fig. 2, and Fig. 3 is a partial detail view of elements which can be substituted for the corresponding elements shown in the embodiments of Figs. 1 and 2.

In studying the operation of upflow sludge clarifiers, I have found that ideally three distinct zones are required within the clarifier. These zones are: (1) a fast mixing or reaction zone, (2) a slow mixing or flocculation zone, and (3) a clarification or sedimentation zone. Heretofore, partitions have been employed in upflow sludge clarifiers to provide separate mixing and clarification zones, but to my knowledge no one has heretofore provided a slow mixing zone between the fast mixing zone and the clarification zone. It is not merely a matter of providing three distinct zones, however, since the zones must interact in a particular manner to achieve the desired results. In the fast mixing zone, the raw water should be thoroughly and rapidly intermixed with the chemical reagents and the recirculated sludge. As the new precipitate begins to form, and before the floc particles have grown to a size that they are broken up by the violent agitation of the fast mixing zone, the water being treated should be passed to the slow mixing zone. In the slow mixing zone, the water should be continually and gently mixed while the particles of floc continue to enlarge in size and until substantially all of the water contaminants have been precipitated. The water then should pass into the clarification zone wherein the circulatory movement is substantially eliminated.

In connection with the above discussion, it must be realized that the mixing zone, the flocculation zone, and the clarification zone must be arranged in open communication with each other so that a continuous flow in either direction can take place within the zones. This poses a difficult problem of equipment design. The desired agitation in the flocculation zone must not be obtained at the expense of interfering with the operation of the clarification zone, such as would be the case if the flocculated material was even occasionally driven into the final stages of the clarification zone. Also, since the separation of the flocculated material from the water is principally effected by passing the water upwardly through a suspended sludge blanket in the lower portion of the clarification zone, it is desirable to provide means for removing the larger, heavier particles of sludge from the lower portion of the sludge blanket. At the same time, it is desirable to circulate the smaller, lighter particles of sludge from the sludge blanket into and through the flocculation zone.

I have discovered that the design objectives which have just been outlined can be achieved in a highly advantageous manner by employing a rotating sludge-collecting pocket within the flocculation zone. I believed this element of my apparatus to be entirely novel. Sludge-collecting pockets have heretofore been used in upflow sludge clarifiers, but as far as I am aware all such pockets have been stationary. Moreover, they have not been definitely located within the flocculation zone as distinguished from the mixing and clarification zones. In water treating apparatus constructed in accordance with my invention, the rotating sludge pocket within the flocculation zone has a unique action. It tends to maintain the integrity of a separate flocculation zone between the mixing zone and the clarification zone by functioning as a special type of mixing element. It also appears to exert a directing action on the character of the sludge material which circulates within the flocculation zone and between the lower portion of the clarification zone and the flocculation zone. As the sludge particles descend centrally within the tank from the lower portion of the clarification zone into the flocculation zone, there appears to be a definite tendency for the particles to be classified by the rotary motion of the pocket. The lighter descending particles are diverted from the mouth of the pocket and are circulated through the flocculation zone, while the heavy, oversize sludge particles are collected in the pocket, and effectively removed from the flocculation zone. Further details of operation will become apparent upon reference to the specific embodiments shown in the accompanying drawings.

Looking first at the embodiment of Fig. 1, there is shown a tank 10 having a partition means 11 therein providing an outer, peripherally-extending chamber 12 and an inner, upwardly-enlarging chamber 13. Chambers 12 and 13 are in open communication beneath partitioning means 11. In the illustration given, tank 10 is circular and is formed of concrete. It can be of other shapes, however, and may be fabricated from other materials such as steel. When tank 10 is circular, outer chamber 12 will be annular, while partitioning means 11 consist generally of a frusto-conical wall. In any case, the horizontal cross-sectional area of chamber 13 should increase progressively in an upward direction from the passage between chambers 12 and 13. For convenience of construction, partitioning means 11 will usually be formed from steel or other metal sheets.

A centrally-positioned, vertically-extending shaft 14 is mounted for rotation within inner chamber 13, appropriate rotational bearings being provided at 15 and 16. A plurality of mixing arms 17 are mounted on the lower end of shaft 14 and arranged to extend outwardly beneath partitioning means 11 into outer chamber 12. In the illustration given, arms 17 consist of hollow pipes having laterally turned outer ends 18, but this construction, while desirable, is not essential for the present invention. On the outer ends of arms 17 are mounted mixing paddles or blades 19 by means of support rods 20.

An open-top vessel 21 is mounted on shaft 14 in the lower portion of inner chamber 13 at a spaced distance from partitioning means 11 for rotation in unison with shaft 14. A plurality of vertically-aligned baffles 22 extend inwardly from partitioning means 11 toward vessel 21 and upwardly to a level above the top of the vessel.

There is also provided means for removing material from vessel 21 while it is rotating with shaft 14. In the illustration given, two such means are provided, one being for recirculation of sludge from vessel 21 to chamber 12, and the other being for discharging sludge from vessel 21 to waste. The recirculation means consists of a pipe 23 within vessel 21 that provides an annular passage 24 around the lower end of shaft 14. Annular passage 24 is arranged to communicate with the inner ends of hollow arms 17, thereby permitting sludge to be drawn from within vessel 21 through annular passage 24 and hollow arms 17, and then discharged into chamber 12. This is accomplished by an aspirating or suction effect which is created by the motion of the laterally turned end portions 18 of arms 17, as described more fully and claimed in my co-pending application Serial No. 272,954, now Patent No. 2,721,173.

In addition, a sludge withdrawal pipe 25 extends into vessel 21 and is provided with an inlet near the bottom thereof. The sludge can be periodically or continuously discharged from the lower portion of vessel 21 through pipe 25 by means of the static pressure within the tank. Preferably, as shown, vessel 21 comprises a conical pocket mounted concentrically on shaft 14 with the mouth of the pocket facing upwardly.

Appropriate pipe means are provided for introducing the raw water into chamber 12. In the illustration given, this consists of a header 26 from which the raw water is discharged into the upper portion of chamber 12 through outwardly-extending pipes 27. If desired, the chemical treating agents can be introduced together with the raw water, or they may be introduced separately. For example, the chemical treating agents may be introduced into chamber 12 through a pipe 28.

Means are provided for rotating shaft 14, which as shown in Fig. 1, consist of an electric motor 29 mounted adjacent the upper end of shaft 14 and arranged to drive the shaft. The apparatus also includes a launder 30 for collection of the clarified water. In the illustration given, the clarified water passes into the launder 30 through perforations 31 in weir wall 32, and then flows outwardly through discharge pipe 33. For the removal of excess sludge from the bottom of the tank, a sump 34 is provided, having a sludge removal pipe 35 connected thereto. Also, if desired, outwardly extending baffles 36 can be provided within outer chamber 12, being arranged with respect to rotating arms 17 and paddles 19 to promote mixing and agitation within the outer chamber.

In the operation of the embodiment of Fig. 1, the raw water and treating reagents are introduced into the upper portion of outer chamber 12, which functions as the fast mixing or reaction zone. A variety of chemical reagents can be used, as is well known in the art, for the purpose of reducing the alkalinity and eliminating the excessive hardness of the water. The commonest of these are perhaps lime, alum, and soda ash. The specific chemicals employed, however, do not form a part of the present invention. Within the zone provided by outer chamber 12, the raw water and chemicals are rapidly and thoroughly intermixed. At the same time, the process of precipitation is accelerated by the mixing of previously formed sludge with the water, the sludge being recirculated from vessel 21 to chamber 12 through the hollow mixing arms 17. After the water has been thoroughly reacted with the chemicals and sludge, but before the new precipitate has formed into large flocks which can be broken up by the turbulent agitation within zone 12, the treated water is passed beneath partitioning means 11 into the lower portion of inner chamber 13. The lower portion of this chamber up to the top of vessel 21 provides the slow mixing or flocculation zone. The continual rotation of vessel 21 maintains the integrity of this zone, and establishes a general swirling or rotary motion of the water. This permits the size of the new sludge particles to increase to a point where the particles can be effectively removed from the water by passing it upwardly through a suspended sludge blanket which extends upwardly from the level of the vessel 21 to a spaced but somewhat variable distance from the top of tank 10. The swirling or rotary motion of the water as it moves from the flocculation zone into the clarification zone is reduced by the action of stilling baffles 22, and at the same time the upward velocity of the water is decreased due to the enlarging cross sectional area of the clarification zone. In the final stages of the clarification zone, near the top of tank 10, the velocity of the water is very low, there is substantially no turbulence, and the water is completely free of suspended sludge particles. The clarified water is then withdrawn through launder 30.

It will be evident that the suspended sludge blanket acts as a filter, removing the newly formed sludge from the water as it passes upwardly. When the particles within the sludge blanket become heavier or larger than can be suspended by the upward velocity of the water, and this occurs continuously, sludge particles will descend from the lower portions of the sludge blanket into the flocculation zone. Most of this oversized material will tend to descend centrally within the tank due to the shielding action of conical vessel 21, which diverts the upwardly rising currents away from the central area of the tank. As the descending material approaches the mouth of vessel 21, the rotary motion of the water in this area will tend to classify the descending material, the lighter material moving outwardly with the rotary currents over the top of vessel 21 and into the flocculation zone. The heavier material will then descend into vessel 21, and either be recirculated to mixing zone 12, as previously described, or removed from the vessel to waste.

The embodiment of Fig. 2 is similar to that of Fig. 1, and therefore corresponding parts have been given the same numbers, except that the numbers have been primed. It will be understood, therefore, that the previous description of the mechanical elements and the operation of these elements for the embodiment of Fig. 1 can be applied to the embodiment of Fig. 2. There is one difference, however, which I desire to discuss.

It will be noted that the stilling baffles 22', instead of being imperforate plates as in the embodiment of Fig. 1, are in the form of perforated grids or expanded metal screens. This construction has a definite advantage when the baffles are made to extend into the flocculation zone and to closely approach the rotary vessel 21'. The rotary motion of the water within the flocculation zone will cause the water and the suspended sludge therein to be thrown against the baffles. The perforated grid construction shown in Fig. 2 gives assurance that the turbid water and sludge will not be thrown upwardly into the clarification zone, so as to interfere with the action of this zone, or prevent the withdrawal of fully clarified water at the top of the tank. The perforated grid construction also cooperates with the rotating vessel to maintain the desired slow agitation within the flocculation zone, while at the same time preventing the swirling or rotary motion of the water from extending itself upwardly into the clarification zone. If desired, the portions of baffles 22' extending above the mouth of pocket or vessel 21' can be made imperforate while the lower portions are perforated.

The partial detail view of Fig. 3 illustrates a modified form of stilling baffle, which is designated generally by the number 22", and the relationship of this baffle to a rotary sludge collecting pocket 21". Baffle 22" is in the form of a grill composed of a plurality of vertically suspended rods 37, which are pivotally connected at their upper end to support bar 38. Bar 38 is suspended by cables 39 so that its height in relation to pocket 21" can be adjusted. For certain installations, this construction might be advantageously substituted for the stilling baffles and rotary sludge collecting pocket arrangements described with respect to the embodiments of Figs. 1 and 2. With larger units, it would permit adjustment of the stilling baffles for controlling the location and extent of the flocculation zone.

While in the foregoing specification this invention has been described in relation to specific embodiments thereof and many details have been set forth for the purpose of illustration, it will be apparent to those skilled in the art that the invention is susceptible to other embodiments and that many of the details set forth herein can be varied considerably without departing from the basic concepts of the invention.

I claim:

1. In a water treating apparatus, a tank having partitioning means therein providing an outer, peripherally-extending chamber and an inner, upwardly-enlarging chamber in open communication with each other beneath said partitioning means, a centrally-positioned, vertically-extending shaft mounted for rotation within said inner chamber, mixing arms mounted on said shaft and extending outwardly beneath said partitioning means into said outer chamber, an open-topped vessel mounted on said shaft in the lower portion of said inner chamber at a spaced distance from said partitioning means for rotation in unison with said shaft, and a plurality of vertically-aligned baffles extending inwardly from said partitioning means toward said vessel and upwardly to a level above the top of said vessel.

2. The combination of claim 1 in which said vessel comprises a conical pocket mounted concentrically on said shaft.

3. The combination of claim 1 in which at least the lower portions of said baffles have openings therethrough for reducing the retarding action of said baffles within the zone immediately adjacent said rotatably-mounted vessel.

4. In a water treating apparatus, a tank having partitioning means therein providing an outer, peripherally-extending chamber and an inner, upwardly-enlarging chamber in open communication with each other beneath said partitioning means, a centrally-positioned, vertically-extending shaft mounted for rotation within said inner chamber, mixing arms mounted on said shaft and extending outwardly beneath said partitioning means into said outer chamber, a conical pocket mounted concentrically on said shaft above said arms and at a spaced distance inwardly from said partitioning means, said pocket enlarging upwardly and having an open mouth at a spaced distance above the lower end of said partitioning means, means for removing material from said pocket when it is rotating with said shaft, and a plurality of vertically-aligned baffles extending inwardly from said partitioning means toward said pocket and upwardly to a level above the top of said pocket said mixing arms carrying upwardly-extending mixing paddle means but only on the portion thereof outwardly of said partition means, whereby there is provided a fast mixing zone in said outer, peripherally-extending chamber and a slow mixing zone in the lower portion of said inner, upwardly-enlarging chamber.

5. The combination of claim 4 in which at least the lower portion of said baffles which extends below the mouth of said pocket are in the form of perforated grids.

6. The combination of claim 4 in which said baffles are composed principally of spaced-apart, vertically suspended rods.

7. The combination of claim 6 in which said rods are suspended from a vertically-adjustable support.

8. In a water treating apparatus, a tank having a frusto-conical partitioning means therein providing an outer, annular chamber and an inner chamber enlarging in cross sectional area in an upward direction, said chamber being in open communication beneath said partition, a centrally-positioned, vertically-extending shaft mounted for rotation within said inner chamber, hollow mixing arms mounted on said shaft and extending outwardly beneath said partitioning means into said outer chamber, a sludge-collecting pocket mounted on said shaft within the lower portion of said inner chamber for rotation in unison with said shaft, means providing a passage from within said pocket to within said hollow arms, the outer end portions of said hollow arms being adapted to discharge sludge from said pocket into said outer chamber, a plurality of vertically-aligned baffles extending inwardly from said partition toward said sludge-collecting pocket and upwardly to a level above the top of said pocket, means for introducing raw water and chemicals into said outer chamber, and means for withdrawing clarified water from the upper portion of said inner chamber.

9. The combination of claim 6 in which said baffles have perforated grid portions extending above and below the top of said pocket.

References Cited in the file of this patent

UNITED STATES PATENTS

| | | |
|---|---|---|
| 2,245,583 | Green | June 17, 1941 |
| 2,347,318 | Gurney | Apr. 25, 1944 |
| 2,673,181 | Hughes | Mar. 23, 1954 |
| 2,721,173 | Lawlor | Oct. 18, 1955 |